W. B. PHINNEY.
MACHINE FOR TRIMMING STRING BEANS AND OTHER ARTICLES.
APPLICATION FILED NOV. 16, 1907.

1,098,398.

Patented June 2, 1914.

UNITED STATES PATENT OFFICE.

WILLIAM B. PHINNEY, OF WESTFIELD, NEW YORK, ASSIGNOR, BY MESNE ASSIGN-MENTS, TO THE PHINNEY ENGINEERING COMPANY, OF CHILLICOTHE, OHIO, A CORPORATION OF OHIO.

MACHINE FOR TRIMMING STRING-BEANS AND OTHER ARTICLES.

1,098,398.  Specification of Letters Patent.  Patented June 2, 1914.

Continuation of application Serial No. 301,761, filed February 19, 1906. This application filed November 16, 1907. Serial No. 402,487.

*To all whom it may concern:*

Be it known that I, WILLIAM B. PHINNEY, a citizen of the United States, residing at Westfield, in the county of Chautauqua and State of New York, have invented a new and useful Improvement in Machines for Trimming String-Beans and other Articles, of which the following is a specification.

This invention relates to a machine for trimming or cutting off opposite ends or tips of string beans and other articles preparatory to cooking or canning the same and has the object to produce a machine whereby this operation is effected automatically, expeditiously, economically, reliably and in a sanitary manner.

An important object of my invention is to provide mechanism to receive in bulk large quantities of string beans or similar articles, comprising individuals of various lengths and thickness, and which differ also in degrees and kinds of crookedness, or departure from the general longitudinal axis of their bodies, and mechanism to treat these articles respectively at a predetermined region or regions of each, as, for example, to remove the tip and stem which terminate the respective ends of each bean. These tips and stems are tough and inedible, and in preparing the beans for canning it has been customary heretofore to remove them by hand, a slow, unsanitary and laborious operation which packers have long desired to replace by automatic trimming machinery, but no machine is in existence for this purpose so far as I am aware.

The stems and tips vary considerably in length in different individual beans so that when the bean is lying in its normal, inert position, a cutting stroke gaged to remove an average length of the tough portion would sometimes fail to remove all of it if it were longer than the average; while on the contrary, if a stem or tip happened to be unusually short the body would be severed at a region involving the removal and waste of a considerable portion of the edible flesh of the bean with the "snip." It is highly important, therefore, to provide for the removal of very short "snips" in order to leave upon the body of the bean as much as possible of the succulent, edible flesh, and thus avoid waste. Accordingly, I have devised a novel method of presenting such articles as beans for treatment, which method utilizes a natural principle or property characteristics of these beans, and this may be understood best, perhaps, if the statement is made briefly that every bean has a region of comparative flexibility at each end which lies within its tip or stem respectively substantially regardless of the length, breadth or contour of the bean, so that when the bean is pressed lengthwise against a suitable abutment, the tip, or stem as the case may be, will be bent over, and a cutter operating upon the bean at a given distance from such abutment will engage each bean so presented at approximately the same relative region of the fleshy portion, and will sever therefrom a "snip" comprising the fibrous tip or stem with only so much of the edible portion as may be permitted by the adjustment of the operating device. Any suitable apparatus and mode of operation may be used to avail of this property, and as a simple and convenient means to carry the principle into effect I may provide mechanism to utilize gravity as the positioning force, after introducing the beans, singly or in groups, to a carrier arranged to tilt in the direction of the length of the beans so that the beans will be permitted to slide down until their lower ends engage a suitable abutment and the weight of the bean will flex its tip or stem, as the case may be, and present the desired region of the bean to the cutter, which may operate adjacent the abutment, and cut off the "snip." I prefer to provide also for tilting the carrier thereafter oppositely to cause the beans to slide in reverse direction until their other ends respectively engage another abutment, and are there trimmed, after which the body portions and snips may be discharged, suitable means being provided preferably for their final delivery separately.

Another important object of my invention is to provide for uniformity in treatment of the beans in quantity and for constant inspection of the beans before and after their operative treatment, and this may be accomplished advantageously if the operating mechanism, as for example a cutter, be arranged at a fixed point in the apparatus, and means provided to carry the beans in sight, and in substantially continuous series, past the cutter, to be trimmed thereby, and as it is desirable for the sake of accuracy in treatment to pre-arrange the beans so that they will be amenable to the positioning force, I prefer to provide means to divide the beans into groups each containing a few beans, and to present these groups in as close succession as possible for the simultaneous action of the cutter upon the individual bean composing each such group. This may be accomplished in any suitable fashion, and as one convenient form of apparatus I may use an endless conveyer having buckets open, in part at least, at the top, and each of a size capable of receiving several beans of different length, width and contour, and loosely enough to permit the beans to arrange themselves in approximate parallelism within the buckets. These buckets are preferably mounted transversely upon the conveyer and may be constructed and arranged to tilt and thus cause the beans in every bucket in succession to slide first toward one end of their bucket and then toward the other end, the buckets being of such cross-section as to facilitate this re-arrangement of the beans, by gravity in the instance described, first to bring all the neighboring tips and stems at one end of the group indiscriminately adjacent to the abutment at the corresponding end of their buckets, and then to bring all the neighboring tips and stems at the other end of the group adjacent to the abutment at the other end of their bucket, the re-arrangement being effected regardless of size and other differences in the beans, such as the pronounced curvature characteristic of a considerable proportion of beans. This curvature tends to cause the beans to become hooked together when in bulk, and the difference in size aggravates this tendency somewhat owing to the cross-arrangement of the smaller beans within the spaces between the larger beans. For this reason it is desirable to use buckets either of a size appropriate to receive beans ranging in size from medium to large or of a size for beans of medium to small proportions, or such other grading by size may be followed as it may be convenient to effect before introduction of the beans in bulk into the supply hopper of my machine, although I do not consider it necessary to divide the beans into the five or six grades for which provision is made in the "grader" through which beans are sometimes passed after trimming by hand, as customary prior to my invention. It is however desirable to arrange the beans in approximately their final parallel relation and grouping prior to their introduction to the buckets of the main conveyer, and this can be accomplished by any suitable means, of which as one convenient form I may embody in the supply mechanism an endless bucket conveyer running upward past the outlet of the supply hopper, each bucket serving in turn to engage and remove from the mass of beans as many as may constitute a group of suitable size to transfer to a corresponding bucket or buckets on the main conveyer. I prefer to provide also means to act upon any beans which may not lie properly within the buckets and to position the same, and as one of the various forms of device suitable for this purpose I find that a brush moving backward over the edges of the buckets acts as a satisfactory embodiment of this feature of my invention, which is of considerable importance, as misplaced beans must be gathered up by hand with resultant loss of time even if they are not soiled or mutilated and so wasted.

The various features of my invention will be illustrated and described fully in the accompanying drawings and specification and pointed out in the claims.

In the accompanying drawings consisting of 4 sheets.

Similar letters of reference indicate corresponding parts throughout the several views.

A represents the main frame of the machine which may be of any suitable construction to properly support the different working parts of the machine. Adjacent to the upper front part of this frame is arranged the feed box or supply hopper B into which the string beans are placed in bulk and preparatory to being fed to the devices which trim off the ends thereof. This feed box has a closed bottom b, two side walls b¹ and a front wall b², leaving its rear end open for the discharge of the beans.

The string beans are carried upwardly out of the feed box or hopper at its open rear end by means of an endless upright elevator belt C passing at its upper end around a supporting wheel c secured to an upper transverse shaft D mounted on the upper rear part of the hopper side walls while its lower end passes around a supporting wheel $c^1$ mounted on a transverse shaft $d$ which is journaled transversely in the lower rear part of the hopper side walls. The relative arrangement of the upper and lower supporting wheels $c$, $c^1$ is such that the front or operative portion of the feed belt C extends upwardly and rearwardly at an angle relatively to the bottom of the feed box. The face of the feed belt is provided with a plurality of transverse carrying or feed wings $e$ which are preferably curved, as shown, thereby causing the same while moving upwardly with the front part of the feed belt to successively engage the string beans in the feed box and carry the same upwardly and then discharge them rearwardly from the wings on the descending rear side thereof.

In order to cause the beans to automatically pass from the feed box to the wings of the feed belt the bottom of the feed box is inclined rearwardly and this box together with the feed belt are shaken or vibrated so as to cause the beans to loosen up and move freely toward the feed belt. This vibratory effect is preferably obtained by journaling the upper transverse shaft D of the feed belt in a bracket F on the main frame and engaging abutments or tappets $f$ on the lower rear part of the feed box with rotary cams G. The relative arrangement of the cams G and the feed box is such that the abutments always rest by gravity against the cams.

Upon rotating the cams by means of a shaft $g$ upon which they are mounted, the feed box and feed belt are alternately moved forward positively by the high parts of the cams and backwardly by gravity when the low parts of the cams are presented to the abutments, whereby a continuous shaking of the feed box and belt is produced which causes the beans to be effectually separated in the feed box and fed off in small quantities by the feed belt. The cam shaft $g$ is journaled in bearings on the lower part of the bracket F and motion is transmitted from said cam shaft to the upper feed shaft D by means of a cross belt $g^1$ passing around pulleys $g^2$, $g^3$ on said cam shaft and upper feed shaft D, respectively.

As the beans are discharged from the upper end of the feed belt the same fall upon the downwardly and rearwardly curved bottom $h$ of a chute H which directs them upon a carrier I whereby the beans are successively presented to the devices which gage and trim or snip off opposite ends thereof. This carrier preferably consists of an endless chain belt $i$ and a plurality of open ended troughs or pockets arranged transversely of this belt. Although these troughs may be constructed in various ways, these shown in the drawings are constructed of sheet metal which is so bent that each trough is substantially semi-circular in cross section. The several troughs or pockets are pivoted centrally on their backs or undersides by individual pins $j$ to the outer side of the carrier belt so that the pockets are capable of tilting transversely toward either side relatively to the line of movement of the carrier belt. The latter is arranged to form an upper horizontal operative portion and a lower horizontal inoperative portion and passes with its front and rear portions around front and rear supporting wheels $j^1$, $j^2$. These wheels are mounted on transverse shafts $j^3$, $j^4$ which are journaled in the vertical side walls $k$, $k$ of a longitudinally vibrating shoe or shaking frame. These side walls are connected by horizontal transverse partitions $k^1$, $k^1$ arranged adjacent to the inner side of the upper and lower part of the carrying belt $i$ and vertical cross pieces or walls $k^2$ connecting the side walls and partitions near opposite ends thereof. The shaking shoe or vibrating support is supported by means of upright spring arms $k^3$ secured at their upper ends to the shaking frame and at their lower ends to the main frame and the shaking frame is operated from a main shaft L on the rear part of the main frame by connecting rods $l$ attached at their front ends to the sides of the shaking frame and provided at their rear ends with straps $l^1$ which embrace eccentrics $l^2$ on the main shaft.

The carrying belt $i$ is driven by means of a cross belt $i^2$ passing around a pulley $i^3$ on the rear carrier shaft $j^4$ and a pulley $i^4$ mounted on an intermediate shaft $i^5$ which is journaled transversely on the adjacent part of the main frame so that the shaking shoe or frame may be operated without interfering with the means which move the carrier. The several bean receptacles or pockets are arranged so close together on the carrying belt that these pockets when moving horizontally forward with the upper operative portion of the belt, engage each other at their upper longitudinal edges thereby forming practically an unbroken bean receiving surface on this portion of the carrying belt and avoiding any intervening spaces between adjacent pockets into which beans can enter and become caught.

Figure 8:
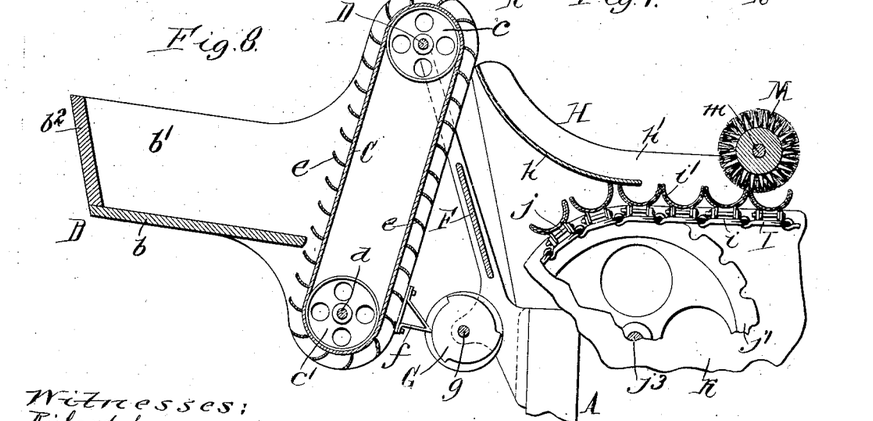
Fig. 8 is a fragmentary vertical longitudinal section of the feed end of the machine.

At their front ends the side walls of the shaking frame or shoe are connected with the side walls $h$ of the chute H so that the latter vibrates with the shaking shoe. The bottom of the chute terminates at its lower rear end about vertically in line with the shaft of the front supporting wheel $j^1$ and close to the path of the bean pockets, as shown in Fig. 8. As the beans escape from the rear end of the bean chute the same drop one or more at a time into the carrying pockets as the same present themselves successively at the rear end of the bean chute.

Owing to the comparatively narrow construction of these pockets and the concave or downwardly dished formation thereof the beans are caused to arrange themselves in a position lengthwise in the pockets or at right angles to the line of movement of the carrying belt. If any beans should be delivered upon the upper edges of the pockets and assume a position obliquely to the pockets the same are brushed off the edges of the pockets and into the hollow thereof by means of a rotary clearing brush M arranged above the carrier in rear of the chute and close to the path of the bean pockets and rotating in a direction opposite to that of said pockets.

Figure 1:
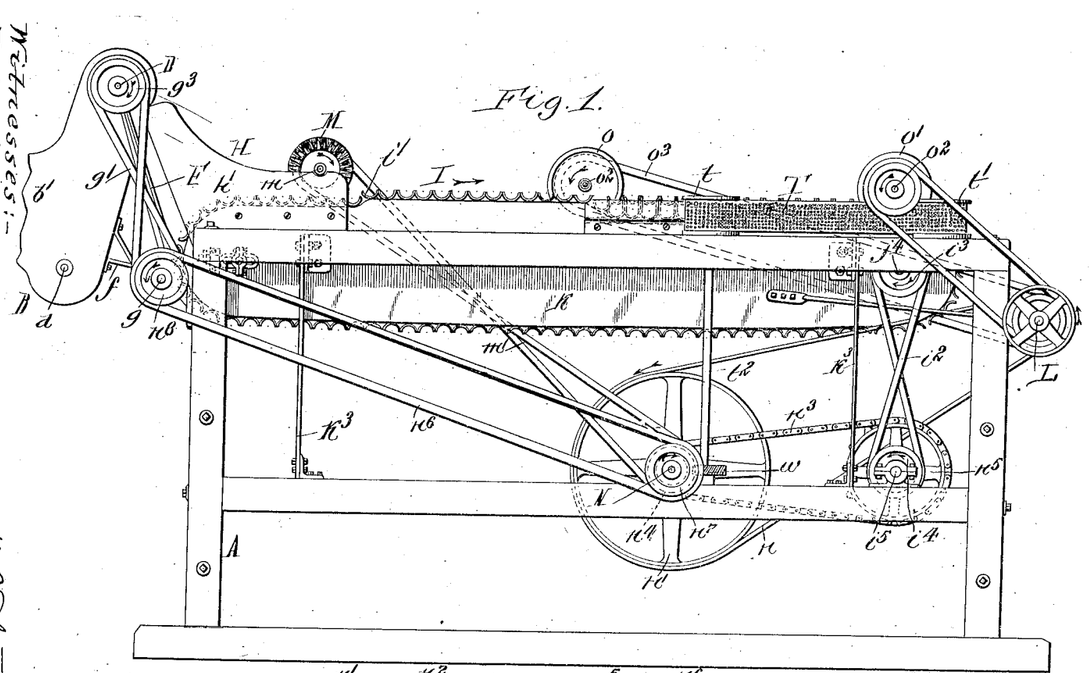
Figure 1 is a side elevation of my string bean trimming or snipping machine.
Figure 5:
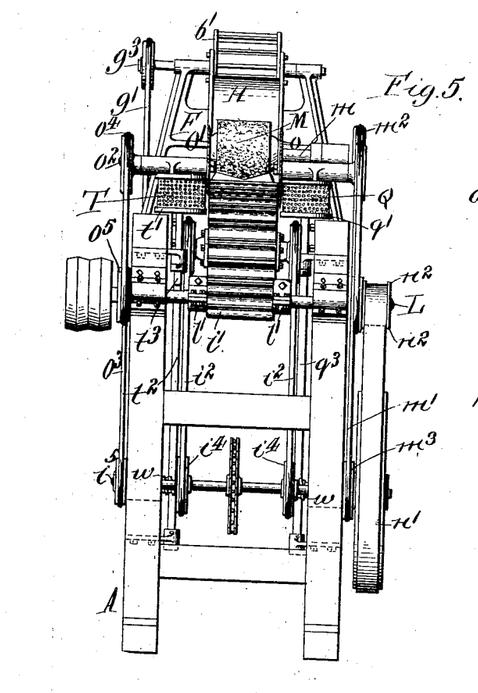
Fig. 5 is an elevation of the machine viewed from the delivery or rear end.

The clearing brush M is secured to a transverse shaft $m$ which is journaled on a bearing on the main frame and is driven by means of a cross belt $m^1$ passing around a pulley $m^2$ on the brush shaft $m$ and another pulley $m^3$ on a counter shaft N journaled transversely on the main frame. The last mentioned shaft is operatively connected by a belt $n$ and pulleys $n^1$, $n^2$ with the main shaft; by a belt $n^3$ and pulleys $n^4$, $n^5$ with the intermediate shaft $i^5$ and by a belt $n^6$ and pulleys $n^7$, $n^8$ with the cam shaft $g$, as shown in Figs. 1, 3 and 5.

Figure 6:
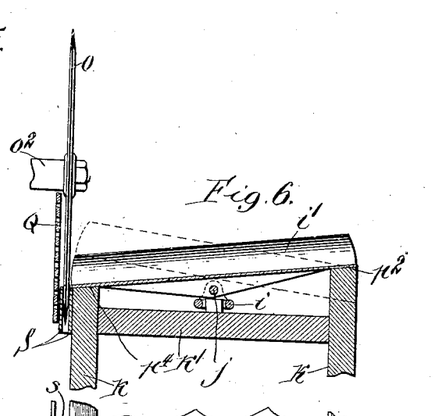
Fig. 6 is a fragmentary cross section, on an enlarged scale, in line 6—6, Fig. 3.

As the beans are carried rearwardly by the pockets the latter are first tilted transversely in one direction, as shown in full lines in Fig. 6, so that the beans slide lengthwise in that direction and project with the corresponding ends beyond the depressed ends of the pockets and then the pockets are tilted in the opposite direction, as shown by dotted lines in Fig. 6, so that the beans slide lengthwise in the pockets toward the opposite depressed ends of the same and cause the corresponding ends of the beans to project with their tips or butts beyond the same.

Figures 3, 4:
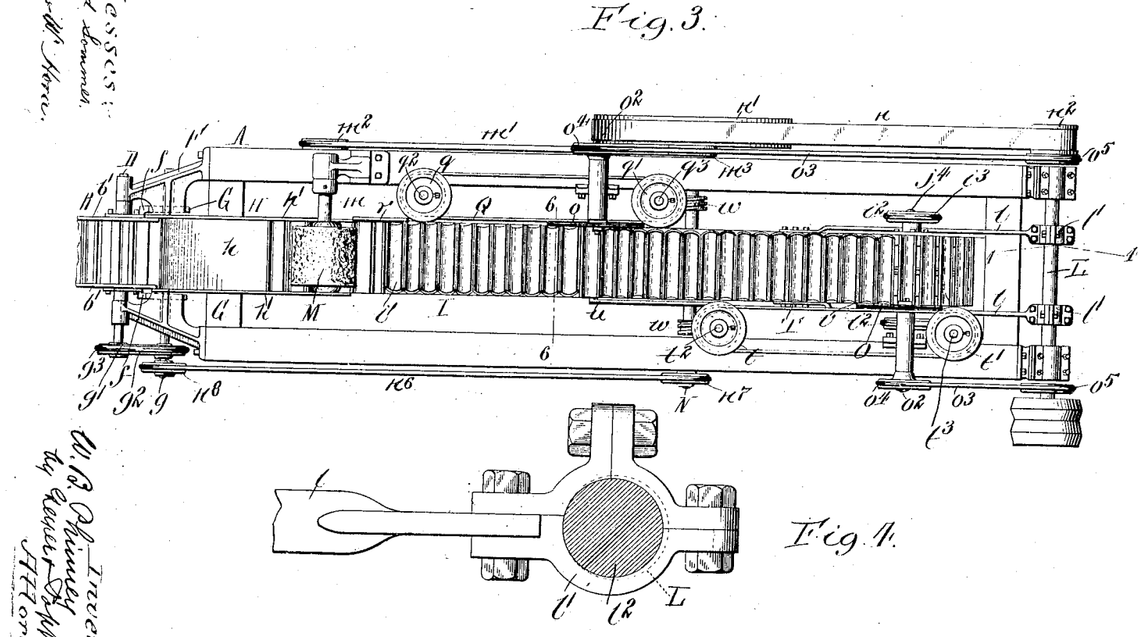
Fig. 3 is a top plan view of the machine.
Fig. 4 is a fragmentary longitudinal section in line 4—4, Fig. 3, showing one of the eccentrics for operating the shaker.
Figure 9:
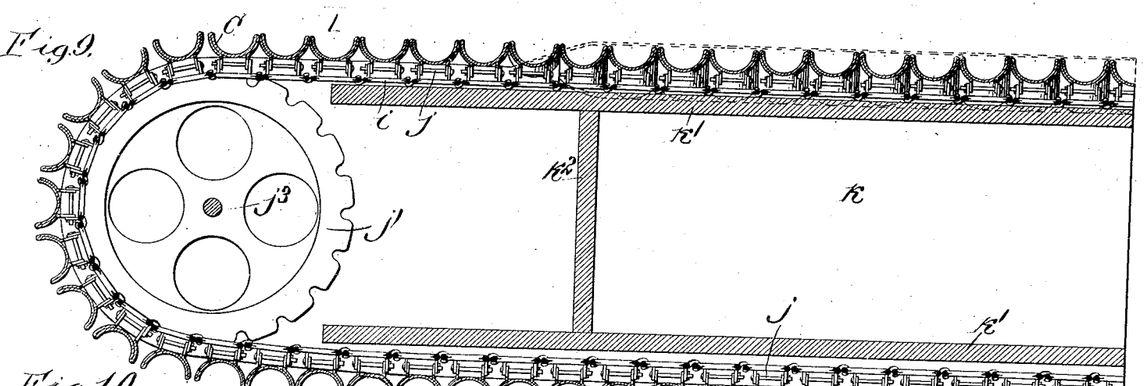
Figs. 9 and 10 are fragmentary longitudinal sections of the front and rear portions of the carrier and adjacent parts.
Figure 10:
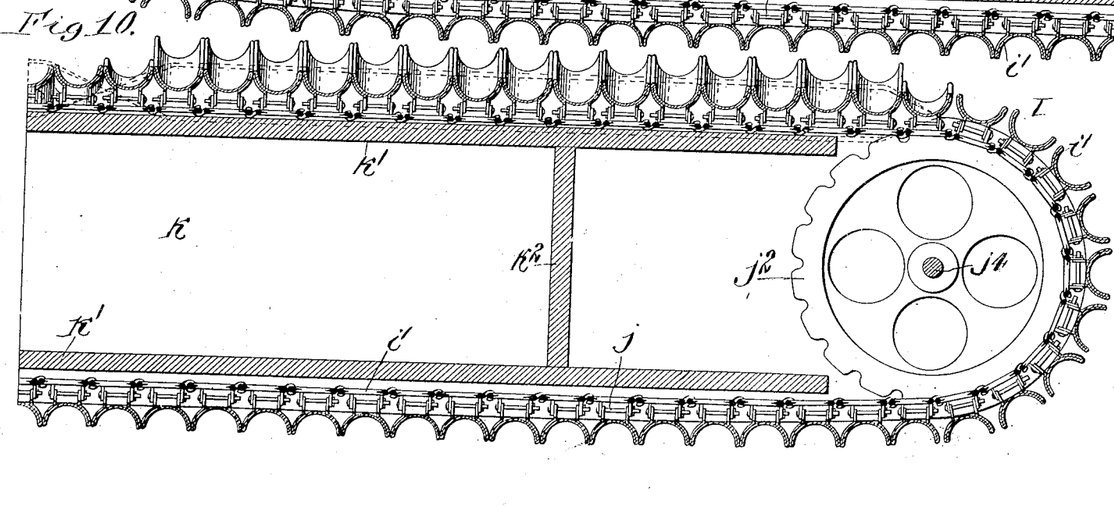

After the pockets have received the beans from the chute and have been tripped laterally the first time, which, as shown in the drawings in Figs. 3, 6 and 9 is toward the left and the beans thereon project with their tips or butts beyond the depressed left ends of the pockets said projecting tips or butts are engaged by the primary cutter O which severs said tips or butts from the body of the beans and which is arranged at the left side of the path of the carrier in the rear of the clearing brush. In like manner the tips or butts of the beans at the opposite ends thereof which project beyond the right ends of the pockets upon subsequently tilting the same in that direction are cut off by another or secondary cutter $O^1$ which is arranged at the right side of the path of the carrier in rear of the primary cutter. These cutters preferably consist of vertical disk knives or circular blades which are arranged on opposite sides of the path of the bean carrier one in advance of the other so as to operate successively upon opposite ends of the beans. Each of these cutters is rotated so that its front side moves downwardly and is mounted on a transverse shaft $o^2$ journaled in a bearing on the main frame and driven from the main shaft by a belt $o^3$ and pulleys $o^4$, $o^5$.

Figure 2:
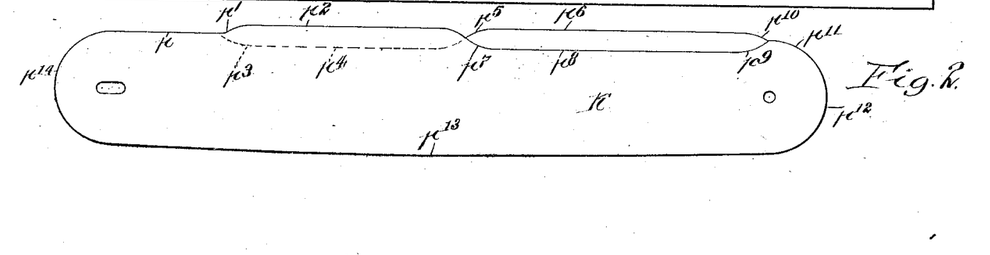
Fig. 2 is a side elevation of the guide which controls the position of the pockets of the bean carrier.

The tilting of the bean pockets in moving with the carrier belt is preferably effected by constructing the edges of the side boards or walls $h$ of the proper shape so as to form cams, guide ways or rails which engage underneath opposite ends of the bean pockets. For this purpose the upper edges of the side walls at the receiving end of the shaking frame are arranged horizontally in line, as shown at $p$ (see Fig. 2), whereby the bean pockets which rest at opposite ends on these portions and at this time receive the beans from the chute are held in a horizontal position so as to properly receive the beans from the chute and enable the clearing brush to straighten the same out in the pockets. After the beans have been thus deposited in the pockets and straightened out the right ends of the pockets engage successively with an upwardly inclined cam face $p^1$ on the right rail $h$ which directs the same to an elevated horizontal part of guide way $p^2$ on said wall while the opposite ends of the pockets engage with a downwardly inclined face $p^3$ on the left rail $h$ which directs the same to a depressed horizontal guide face or way $p^4$ on the edge of said rail. The elevated and depressed guide faces $p^2$, $p^4$ of the shaking frame continue rearwardly a sufficient distance to retain the bean pockets in the inclined position which they are caused to assume by these guide ways until the depressed left ends of these pockets have passed the primary cutter or trimming knife O. Thereafter the depressed left ends of the bean pockets engage with an upwardly extending incline $p^5$ on the upper edge of the left rail which lifts the corresponding ends of the bean pockets successively to a horizontal elevated guide face or way $p^6$ on the corresponding rail of the shaking frame while the opposite ends of the bean pockets follow a downwardly inclined guide face $p^7$ on the right rail which directs the same to a horizontal depressed guide face $p^8$ on the corresponding rail. The bean pockets are retained in this position by the guide faces $p^6$, $p^8$ until they have passed the secondary cutter or trimming knife $O^1$ and the latter has removed the tips or butts from the beans which project beyond the depressed right ends thereof. After the second trimming operation the depressed and elevated ends of each of the bean pockets engage with upwardly trending and downwardly trending inclines $p^9$ $p^{10}$ formed respectively on the left and right rails of the shaking frame which conduct these ends to the delivery guide ways or faces $p^{11}$ of these rails which are horizontally in line and hold the pockets in this position while discharging the trimmed beans from the pockets at the rear end of the carrying belt. The pockets are retained in this horizontal position as they pass around the rear ends $p^{12}$ the lower horizontal edges $p^{13}$ and around the front ends $p^{14}$ of the rails, the faces of the rails at these places being arranged horizontally in line for this purpose.

For limiting the distance or extent which the beans can project beyond the depressed ends of the pockets and cause them to be retained in a proper position for cutting off the tips and butts thereof, the required extent as they pass the cutters, gaging or controlling means are provided which are constructed as follows: Q represents a primary gage belt having its operative portion arranged vertically adjacent to the outer side of the primary cutter and extending lengthwise past the depressed left ends of the bean pockets from a point a considerable distance in advance of the cutter O to a point a short distance in rear of said cutter. This belt is supported at its front and rear ends by means of pulleys $q$, $q^1$ which are secured to upright shafts $q^2$, $q^3$ journaled on the main frame. Extending from the front end of the primary gage belt to the adjacent left side wall of the chute and close to the adjacent ends of the bean pockets is a guard plate or board $r$. As the bean pockets are first tilted toward the left after being filled during their rearward movement the beans in sliding toward that end of the pockets strike the guard plate $r$ and are prevented thereby from escaping from the pockets. After clearing the rear end of the guard plate the beans engage their depressed left ends with the gage belt Q which latter moves forward with its operative portion at the same speed as the bean carrier. This gage belt is perforated, as shown, or constructed of other open work or foraminous material, the openings of which receive the tips and butts of the beans, thereby enabling the cutter to trim off the beans uniformly at the base of the tips and butts regardless of the length of the same.

Figure 7:
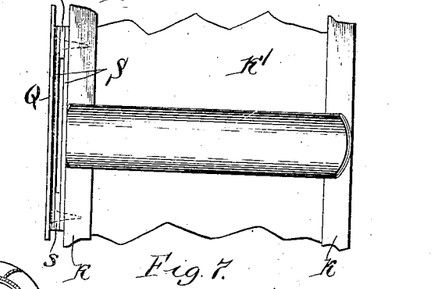
Fig. 7 is a top plan view thereof.

In order to prevent the beans from being tilted or displaced in the pockets upon being engaged by the primary cutter during the trimming operator, a pair of shearing or supporting bars or blades S, S are arranged lengthwise on opposite sides of the lower portion of the primary cutter O and below the path of the left ends of the beans which project beyond the corresponding depressed ends of the pockets. These bars are separated to form a slot between them being held in this position by space blocks $s$, $s$ inserted between the ends thereof and secured to the adjacent part of the shaking frame by screws or otherwise, as shown in Fig. 7. As the beans are moved by the pockets past the primary cutter the left ends thereof are carried over the shearing bars S, S and sustained by the latter as the beans move underneath the primary cutter thereby causing the beans to be trimmed without displacing the same in the pockets.

As the beans approach and pass the secondary cutter the same coöperate with a gaging device similar to that which coöperates with the primary cutter. This second gaging device consists of a perforated gage belt T arranged lengthwise and vertically along the right ends of the bean pockets and the outer side of the secondary cutter $O^1$ from a point some distance in front of this cutter to a point a short distance in rear of the same. This gage belt is supported upon the front and rear pulleys $t$, $t^1$ which are secured to vertical shafts $t^2$, $t^3$ journaled on the main frame and moves with its operative inner side in the same direction as the bean carrier and at the same speed. Extending forwardly from the front end of the second gage belt to a point opposite the cutting line of the primary cutter is arranged a guard plate or board $u$ which operates to close the right ends of bean pockets before they reach the right gage belt. Upon tilting the bean pockets toward the right during their continued rearward movement after the left ends of the beans have been trimmed off, the right ends in sliding toward the opposite ends of the pockets first engage with the guard plate $u$ and are prevented thereby from escaping from the bean pockets. Upon clearing this guard plate the right ends of the beans engage with the operative portion of the second gage belt T and the tips and butts on that end of the beans pass through the openings in this gage belt, whereby the same are properly gaged and trimmed off the required extent upon passing underneath the second cutter $O^1$. While being thus cut the right ends of the beans are supported by a pair of supporting blades or shearing bars $v$, $v$ which are arranged lengthwise on opposite sides of the lower part of the second cutter and below the path of the beans and secured to the adjacent parts of the shaking frame in the same manner as the supporting or shearing bars which coöperate with the first cutter. Any suitable means may be provided for moving the gage belts, that shown in the drawings consisting of intermeshing spiral gear wheels $w$ secured to the counter shaft, the rear shaft $q^3$ of the front gage belt and the front shaft $t^2$ of the rear gage belt.

Although some of the beans upon being tilted together with the pocket, trough or support slide by their own weight downwardly in the latter toward the depressed end thereof and push their tips or stems through the perforations of the gage belts Q, T a considerable portion of the beans engage their tips and stems with the solid or imperforate parts of said gages and the tips and stems of such beans are therefore flexed by the weight of the beans. The regions of comparative flexibility of each bean lie within its tip and stem between the edible body or main part of the bean and its extremity. When a bean is pressed lengthwise against the abutment represented by the imperforate parts of the gage Q or T the tip or stem if present and projecting normally beyond the body of the bean in the direction of its length will be bent or flexed. The cutter which is arranged a predetermined distance from such abutment therefore operates upon the bean at approximately the same relative region of the fleshy portion of the bean and severs therefrom a "snip" comprising the tough or fibrous tip or stem, as the case may be, together with only so much of the edible portion of the bean as may be permitted by the relative adjustment of the cutter and abutment.

By mounting the bean carrier on a shoe, support or frame which is shaken constantly the beans are maintained in a loose condition in the pockets and caused to slide freely lengthwise of the pockets upon tilting the same in either direction, thereby insuring proper engagement of the ends of the beans with the gage belts and are caused to project the required extent beyond the ends of the pockets to permit trimming off the proper amount of their tips and butts.

The above described machine may be used for trimming articles or materials other than string beans. For instance, the same may be used to cut off the ends of the husks and butts of green corn preparatory to removing the husk and kernels from the cob, or the same may be used for cutting off the heads of fish in canning factories.

I claim as my invention:—

1. A machine for trimming string beans and other articles comprising a movable carrier, a plurality of pockets pivoted on said carrier so as to be capable of tilting transversely to the line of movement of the carrier, means for tilting the pockets, a cutter which is arranged at the depressed end of the pockets and to which the articles are presented by said pockets, and means for limiting the movement of the articles in the pockets toward said cutter, substantially as set forth.

2. A machine for trimming string beans and other articles comprising an endless belt, a plurality of trough shaped pockets pivoted on said belt so as to be capable of tilting transversely to the line of movement of the belt, means for tilting the pockets, a cutter which is arranged at the depressed ends of the pockets and to which the articles are presented by said pockets, and means for limiting the movement of the articles in the pockets toward said cutter, substantially as set forth.

3. A machine for trimming string beans and other articles comprising an endless belt, a plurality of open ended troughs shaped pockets arranged transversely and pivoted on the belt, means for tilting the pockets transversely, a cutter which is arranged at the depressed ends of the pockets and to which the articles are carried by said pockets, and means for limiting the transverse sliding movement of the articles in said pockets, substantially as set forth.

4. A machine for trimming string beans and other articles, comprising an endless carrier, a plurality of trough shaped pockets arranged transversely and pivoted on the carrier, means for tilting the pockets successively in opposite directions, cutters arranged on opposite sides of the path of said pockets and adjacent to the depressed ends thereof and operating to successively trim off the ends of the articles projecting beyond the ends of the pockets, and means for limiting the transverse sliding movement of the articles in said pockets, substantially as set forth.

5. A machine for trimming string beans and other articles comprising an endless belt, a plurality of open ended trough shaped pockets arranged transversely and pivoted centrally on the belt, means for tilting the pockets first toward one side of the belt and then toward the other side of the belt, a rotary cutter for severing one end of the articles arranged adjacent to the depressed end of the pockets when tilted in one direction, another rotary cutter for severing the other end of the articles arranged adjacent to the depressed end of the pockets when tilted in the opposite direction, and means for limiting the transverse movement of said articles in said pockets, substantially as set forth.

6. A machine for trimming string beans and other articles comprising an endless belt, a plurality of open ended trough shaped pockets arranged transversely and pivoted centrally on the belt, means for tilting the pockets successively in opposite directions consisting of cam guide ways which are engaged by the ends of the pockets, cutters which are arranged on opposite sides of the path of the pockets and to which the articles are presented by said pockets, and means for limiting the transverse movement of the articles in the pockets, substantially as set forth.

7. A machine for trimming string beans and other articles comprising an endless belt, a plurality of trough shaped pockets arranged transversely and pivoted on the belt, means for tilting the pockets successively in opposite directions, means for limiting the transverse movement of the articles, cutters arranged adjacent to the depressed ends of the pockets, and means for supporting the ends of the articles and coöperating with said cutters for severing the ends of the articles, substantially as set forth.

8. A machine for trimming string beans and other articles comprising an endless belt, a plurality of open ended trough shaped pockets arranged transversely and pivoted centrally on the belt, means for tilting the pockets successively in opposite directions, circular cutters arranged adjacent to the depressed ends of the pockets, means for supporting the ends of the articles when operated on by said cutters consisting of a pair of shearing bars arranged lengthwise on opposite sides of the cutter disk and below the path of the articles, and means for limiting the length of the ends of the articles projecting beyond the ends of the pockets, substantially as set forth.

9. A machine for trimming string beans and other articles comprising a carrier, means for tilting said carrier, a cutter which is arranged adjacent to the depressed part of the carrier and to which the articles are delivered by said carrier, and a gage arranged along the depressed part of the carrier and adapted to be engaged by the ends of the articles on the carrier, substantially as set forth.

10. A machine for trimming string beans and other articles comprising a carrier, means for tilting said carrier, a cutter which is arranged adjacent to the depressed part of the carrier and to which the articles are delivered by said carrier, and a gage consisting of a belt arranged lengthwise of the depressed part of the carrier and movable in the same direction, substantially as set forth.

11. A machine for trimming string beans and other articles, comprising a carrier, means for tilting said carrier, a cutter which is arranged adjacent to the depressed part of the carrier and to which the articles are delivered by said carrier, and a gage consisting of a perforated belt arranged lengthwise of the depressed part of the carrier and movable in the same direction, substantially as set forth.

12. A machine for trimming string beans and other articles comprising a carrier, means for tilting said carrier, a cutter which is arranged adjacent to the depressed part of the carrier and to which the articles are delivered by said carrier, a gage consisting of a perforated belt arranged adjacent to the cutter and lengthwise of the depressed part of the carrier, and pulleys arranged in front and in rear of said cutter and supporting the gage belt, substantially as set forth.

13. A machine for trimming string beans and other articles comprising a vibrating support, an article carrier arranged on said support, a cutter arranged adjacent to the side of said carrier, means for tilting said carrier toward that side on which the cutter is arranged, and means for limiting the transverse sliding movement of the article in said carrier, substantially as set forth.

14. A machine for trimming string beans and other articles comprising a vibrating support, an endless belt passing around wheels journaled on said support, a plurality of open ended trough shaped pockets pivoted centrally to said belt, means for tilting said pockets transversely, cutters arranged adjacent to the depressed ends of the pockets, and means for limiting the length of the ends of the articles projecting beyond the ends of the pockets, substantially as set forth.

15. A machine for trimming string beans and other articles, comprising a vibrating support, an endless belt passing around wheels journaled on said support, a plurality of open ended trough shaped pockets pivoted centrally to said belt, means for tilting said pockets transversely consisting of cam rails or ways arranged on said support and engaging with opposite ends of the pockets, cutters arranged adjacent to the depressed ends of the pockets, and means for limiting the length of the ends of the articles projecting beyond the ends of the pockets, substantially as set forth.

16. A machine for trimming string beans and other articles comprising a vibrating support, an endless belt passing around wheels journaled on said support, a plurality of open ended trough shaped pockets pivoted centrally to said belt, means for tilting said pockets transversely consisting of cam rails or ways arranged on said support and engaging with opposite ends of the pockets, cutters arranged adjacent to the depressed ends of said pockets, and movable gages arranged along the open ends of the pockets adjacent to the cutter, substantially as set forth.

17. A machine for trimming string beans and other articles comprising a vibrating support, an endless belt passing around wheels journaled on said support, a plurality of open ended trough shaped pockets pivoted centrally to said belt, means for tilting said pockets transversely consisting of cam rails or ways arranged on said support and engaging with opposite ends of the pockets, cutters arranged adjacent to the depressed ends of said pockets, and perforated gage belts arranged lengthwise of the open ends of said pockets adjacent to said cutter, substantially as set forth.

18. A machine for trimming string beans and other articles comprising a main frame, a vibrating support, spring arms connecting said vibrating support and the main frame, a shaft journaled on the main frame and having eccentrics, straps surrounding said eccentrics and connected with the vibrating support, an endless belt mounted on said support, a plurality of transverse open ended pockets pivoted on said belt, means for tilting said pockets alternately in opposite directions, cutters arranged on opposite sides of the path of said pockets adjacent to their depressed ends, and gages arranged along the ends of said pockets adjacent to said cutters, substantially as set forth.

19. A machine for trimming string beans and other articles comprising a main frame, a vibrating support, a carrying belt mounted on said support, a plurality of transverse open ended pockets pivoted on said belt, cam rails or ways arranged on said support and operating on the ends of said pockets for tilting the same alternately in opposite directions, circular cutters mounted on the main frame and arranged on opposite sides of said belt adjacent to the depressed ends of the pockets, shearing bars arranged on the vibrating support on opposite sides of the cutters, and gage belts mounted on the main frame and arranged with their operative parts lengthwise of the depressed ends of the pockets adjacent to the cutters, substantially as set forth.

20. A machine of the character described, comprising a carrier, a pocket tiltable on said carrier, means for tilting the pocket, means for cutting off the article in the pocket at the depressed end thereof, and means for limiting the movement of the article in the pocket to the cutting position, substantially as set forth.

21. A machine for the purpose described comprising a tiltable pocket, means for tilting the pocket, and causing the article to be trimmed to slide toward the depressed end thereof, a cutter arranged at the depressed end of the pocket, and means for limiting the movement of the articles in the pocket toward said cutter, substantially as set forth.

22. A machine for the purpose described comprising a tiltable pocket, means for tilting the pocket in opposite directions, cutters arranged at the depressed ends of the pocket, and means for limiting the movement of the articles in the pocket toward said cutters, substantially as set forth.

23. A machine of the character described comprising a tiltable support adapted to receive an article to be trimmed, means for tilting said support for causing the article to slide thereon toward the depressed end of the same, means for limiting the movement of said article toward the depressed end thereof, and a cutter for trimming the depressed end of said article, substantially as set forth.

24. A machine for the purpose described comprising a tiltable pocket or carrier, means for tilting the pocket and causing the article to be trimmed to slide therein toward the depressed end of the pocket, means for limiting the movement of the articles in the pocket toward the depressed end thereof, a cutter operating to trim that end of said article which has been depressed with the pocket, and a propeller on which said pocket is mounted, substantially as set forth.

25. A machine for trimming string beans and other articles comprising a support adapted to receive the article to be trimmed, means for causing the support to incline alternately in opposite directions, means for limiting the movement of the articles on said support toward either end thereof, and means for severing the depressed ends of the articles, substantially as set forth.

26. A machine for trimming string beans and other articles, comprising a plurality of pockets or supports, means operating to propel said pockets and incline the same alternately in opposite directions relatively to the vertical, means for limiting the lengthwise sliding movement of the articles in said pockets toward either depressed end thereof, and cutters for severing the ends of the articles which have been depressed, substantially as set forth.

27. Apparatus for treating articles of the class described, said apparatus comprising means to feed said articles transversely in a predetermined path, means tending to cause longitudinal movement of said articles respectively into position for treatment of one end of each article, and means tending to cause subsequent reverse movement of said articles respectively for treatment of their other ends, substantially as described.

28. Apparatus for trimming beans, said apparatus comprising means to feed said beans transversely in a predetermined path, means tending to cause longitudinal movement of said beans respectively into position for removal of one end of each bean, and means tending to cause subsequent reverse movement of said beans respectively for removal of their other ends, substantially as described.

29. In a machine of the character described, the combination of a carrier adapted to receive an article to be trimmed and having an outlet at one of its ends, means for tilting said carrier so that its outlet is depressed, a cutter arranged at the depressed end of the carrier for severing the tip of said article in the carrier, and means for confining the body of said article in said carrier but permitting the escape therefrom of the severed tips.

30. In a machine of the character described, the combination of a carrier adapted to receive an article to be trimmed and having an outlet at opposite ends, means for tilting the carrier alternately in opposite direction, cutters for severing the tips at opposite ends of said article in the carrier, and means for confining the body of said article in said carrier but permitting the escape therefrom of the severed tips.

Witness my hand this 14th day of November, 1907.

WILLIAM B. PHINNEY.

Witnesses:
  THEO. L. POPP,
  EMMA M. GRAHAM.